US010710406B1

(12) United States Patent
Depoorter et al.

(10) Patent No.: US 10,710,406 B1
(45) Date of Patent: Jul. 14, 2020

(54) ASSEMBLY FOR A VEHICLE AXLE INCLUDING A DIFFERENTIAL

(71) Applicant: Volvo Truck Corporation, Göteborg (SE)

(72) Inventors: Yann Depoorter, Lyons (FR); Thomas Barillot, Mornant (FR); Serge Vananty, Chassieu (FR); Chris Clezardin, Saint Maurice sur Dargoire (FR); Michael Joliet, Montseveroux (FR)

(73) Assignee: VOLVO TRUCK CORPORATION, Göteborg (SE)

( * ) Notice: Subject to any disclaimer, the term of this patent is extended or adjusted under 35 U.S.C. 154(b) by 0 days.

(21) Appl. No.: 16/470,686

(22) PCT Filed: Dec. 20, 2016

(86) PCT No.: PCT/IB2016/001915
§ 371 (c)(1),
(2) Date: Jun. 18, 2019

(87) PCT Pub. No.: WO2018/115916
PCT Pub. Date: Jun. 28, 2018

(51) Int. Cl.
*B60B 35/18* (2006.01)
*B60B 35/12* (2006.01)
(Continued)

(52) U.S. Cl.
CPC ............ *B60B 35/18* (2013.01); *B60B 35/125* (2013.01); *B60B 35/16* (2013.01); *B60B 2380/14* (2013.01);
(Continued)

(58) Field of Classification Search
CPC ....... B60B 35/18; B60B 35/125; B60B 35/16; B60B 2380/14; B60B 35/00; B60K 17/046; F16C 2326/02
(Continued)

(56) References Cited

U.S. PATENT DOCUMENTS

| 3,686,978 A | 8/1972 | Knoblach et al. |
| 3,969,950 A * | 7/1976 | Rau .................. B60K 17/14 74/391 |

(Continued)

FOREIGN PATENT DOCUMENTS

DE 3424730 A1 10/1985

OTHER PUBLICATIONS

International Search Report and Written Opinion for International Patent Application No. PCT/IB2016/001915, dated Nov. 3, 2017, 8 pages.

*Primary Examiner* — Paul N Dickson
*Assistant Examiner* — Kurtis Nielson
(74) *Attorney, Agent, or Firm* — Withrow & Terranova, PLLC

(57) ABSTRACT

Disclosed is an assembly to be mounted at an end portion of an axle of a vehicle, the axle including a differential carrier housing containing a differential and drive shafts, each having one end connected to the differential and a second end to connect to a wheel of the vehicle. The assembly includes a cover to be mounted at the end portion of the axle and fastened to a wheel hub, and a stop elastically compressible in the axial direction and fastened to the cover so as to face and contact one end face of a drive shaft. The stop includes a first part having a first cross-section S1 and configured to absorb in compression axial movements of the drive shaft, and a second part having a second cross-section S2 smaller than the first cross-section S1 and configured to provide a substantially point contact with the drive shaft end face.

25 Claims, 3 Drawing Sheets

(51) Int. Cl.
*B60K 17/04* (2006.01)
*B60B 35/16* (2006.01)

(52) U.S. Cl.
CPC ........ *B60K 17/046* (2013.01); *F16C 2326/02* (2013.01)

(58) Field of Classification Search
USPC ........................................................ 180/372
See application file for complete search history.

(56) References Cited

U.S. PATENT DOCUMENTS

| | | | | |
|---|---|---|---|---|
| 4,158,972 | A * | 6/1979 | Chamberlain | F16H 1/46 475/337 |
| 4,437,530 | A | 3/1984 | De Young et al. | |
| 6,662,896 | B1 * | 12/2003 | Karlsson | B60K 17/046 180/348 |
| 7,204,782 | B2 * | 4/2007 | Ciszak | B60K 17/046 475/331 |
| 8,795,130 | B2 * | 8/2014 | Forrest | F16D 11/14 475/302 |
| 9,022,892 | B1 * | 5/2015 | Marsh, Jr. | F16H 48/11 475/228 |
| 2012/0217793 | A1 * | 8/2012 | Drum | F16H 57/0445 301/124.1 |
| 2016/0263987 | A1 * | 9/2016 | Brownell | F16D 25/10 |
| 2017/0239989 | A1 * | 8/2017 | Downs | F16C 19/386 |

\* cited by examiner

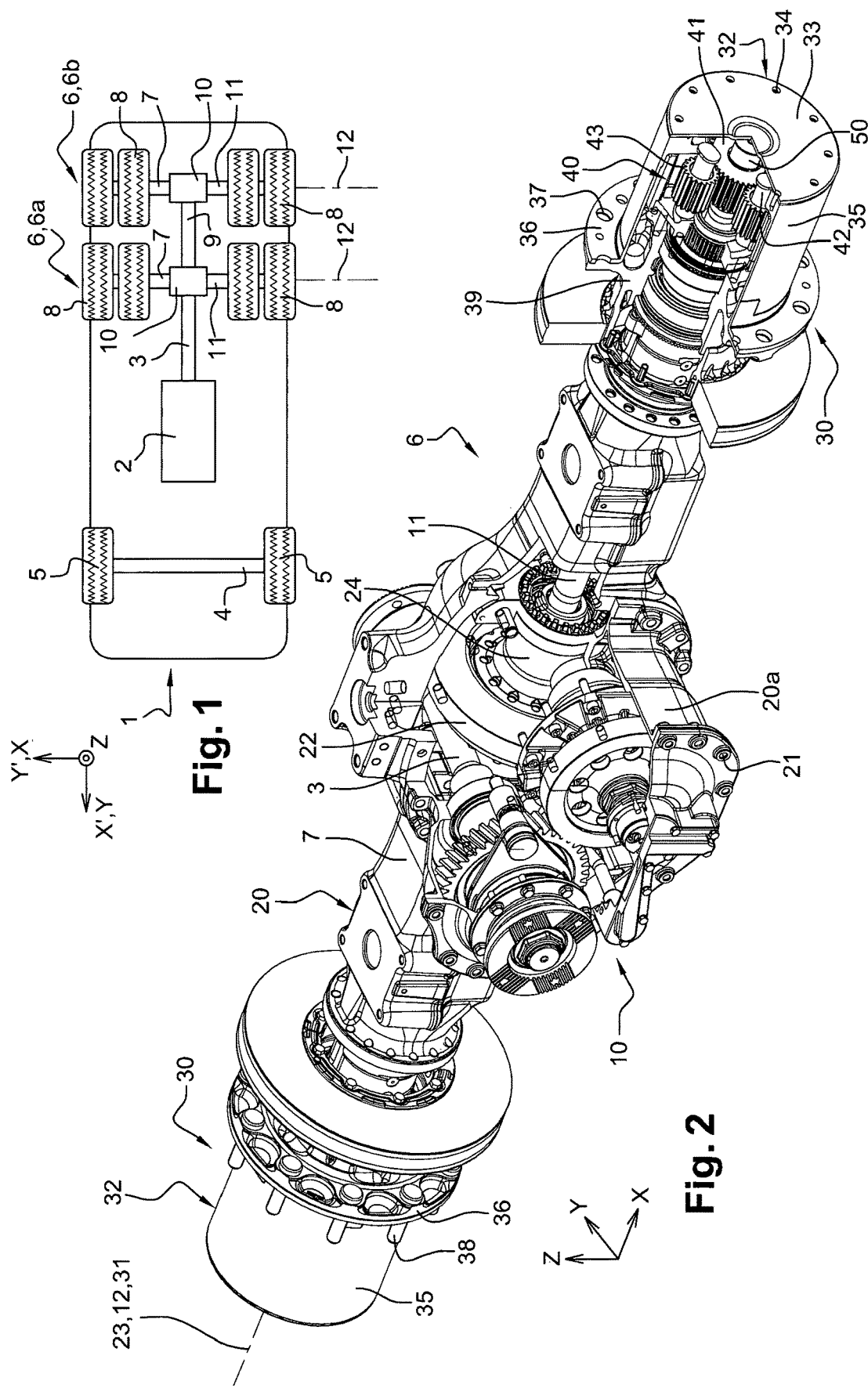

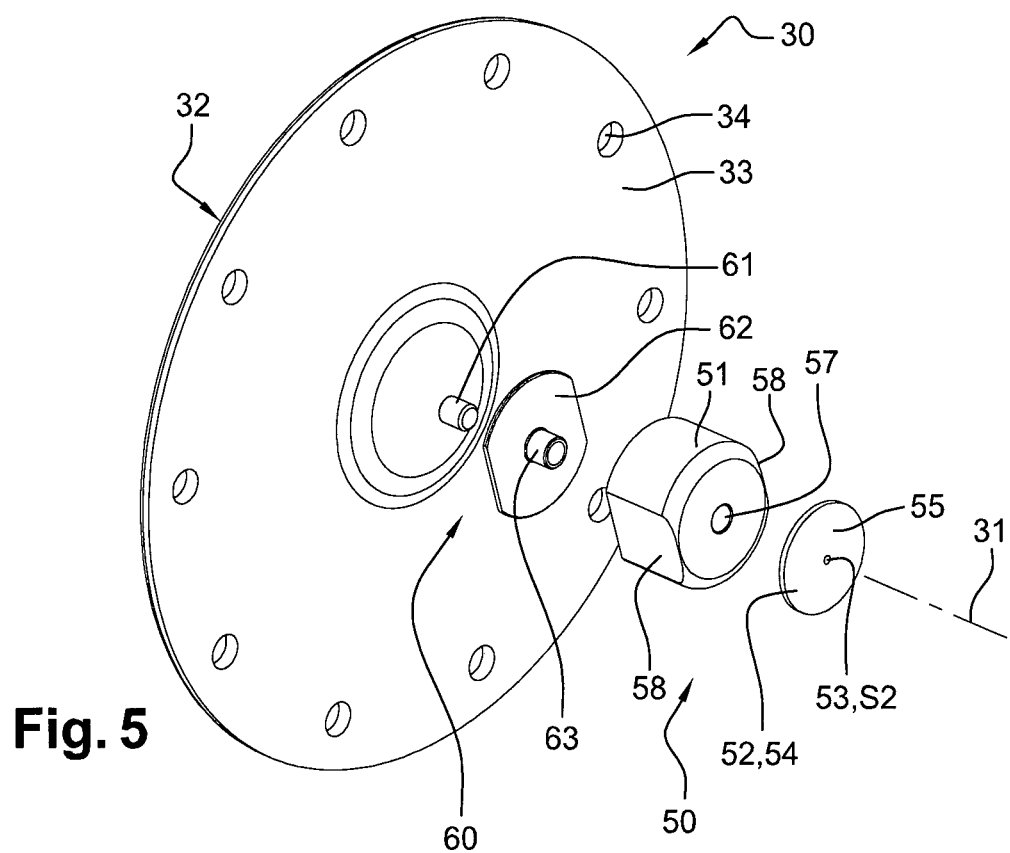
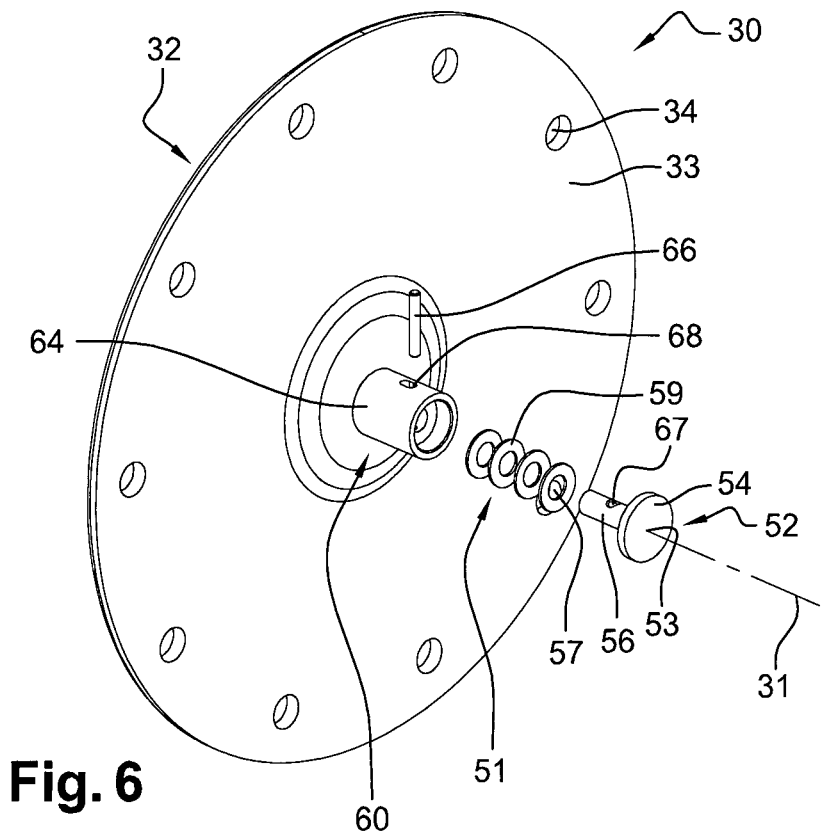

ASSEMBLY FOR A VEHICLE AXLE INCLUDING A DIFFERENTIAL

This application is a 35 USC 371 national phase filing of International Application No. PCT/IB2016/001915, filed Dec. 20, 2016, the disclosure of which is incorporated herein by reference in its entirety.

TECHNICAL FIELD

The invention concerns an assembly for a vehicle axle including a differential, dealing with issues related to axial movements of the drive shaft. The invention also relates to a system comprising an axle and such an assembly, and to a vehicle comprising such a system.

The invention can be applied in heavy-duty vehicles, such as trucks, buses and construction equipment.

BACKGROUND

A vehicle such as a truck is generally equipped with one or several differential units on its driven axles.

Typically, such an axle comprises a differential carrier housing which contains a differential and two drive shafts each having one end connected to the differential and a second end connected to a wheel of the vehicle via a wheel hub. Furthermore, a cover is mounted at each end portion of the axle. A stop is provided between the cover and the facing end of the drive shaft, in order to limit the movement of the drive shaft along the axle axis, and to ensure proper operation of the axle.

Such stops are under significant constraints:

in use, and in particular during gearshifts, a drive shaft can move along the axle axis towards the corresponding wheel, which causes shocks on the cover and can ultimately result in the cover breakage;

as the stop is fastened to the cover and in contact with the drive shaft end face, which rotates with respect to the cover, the stop is subjected to high friction efforts. This leads to premature wear, unless expensive specific treatments of the pieces or expensive specific intermediate components (such as a ball bearing) are provided.

Therefore, many stops of the prior art have a fairly low durability, which requires maintenance.

Another weakness of the stops of the prior art is that they require complex adjustments during production to provide an appropriate clearance between the drive shaft end face and the stop arranged on the cover.

SUMMARY

An object of the invention is to provide an improved system for limiting the drive shaft movements along the axle axis.

More specifically, an object of the invention is to provide a system which requires as little adjustment on the assembly line as possible, which reduces shocks on the cover and increase durability.

To that end, and according to a first aspect, the invention concerns an assembly designed to be mounted at an end portion of an axle of a vehicle, the axle comprising a differential carrier housing which contains a differential, two drive shafts and two wheel hubs, wherein each drive shaft has one end connected to the differential and a second end capable of being connected to at least one wheel of the vehicle via a wheel hub, the assembly having an axis which corresponds to the axle axis, in the mounted position. The assembly comprises:

a cover designed to be mounted at the end portion of the axle;

a stop fastened to the cover so as to face one end face of a drive shaft in the mounted position, the stop being elastically compressible in the axial direction between the cover and an end of the drive shaft or between the cover and an intermediate piece that can be provided in the axle. When provided, said intermediate piece is connected to an end of the drive shaft and is axially located between said drive shaft end face and said stop.

Furthermore, according to the invention, the stop comprises:

a first part having a first cross-section S1, the first part being dimensioned to absorb in compression axial movements of the drive shaft;

a second part having a second cross-section S2 smaller than the first cross-section S1, the second part being designed to provide a substantially point contact with the drive shaft end face or with the intermediate piece.

Providing an elastically compressible stop contributes to absorbing shocks and thus allows protecting the cover against damages and possible breakage. Moreover, it allows decreasing—or even completely remove—the need for adjustment on the assembly line.

The first part of the stop is intended to support axial compression efforts, in normal operating conditions, and is dimensioned accordingly, by the choice of an appropriate material and a large enough first cross section S1.

Besides, because the stop according to the invention provides a substantially point contact with the drive shaft end face or with the intermediate piece, the friction efforts are considerably limited, which reduces wear and increases the service life. More specifically, the substantially point contact may be located on or near the axle axis, where the relative rotational speed—i.e. the relative angular velocity—between the drive shaft and the cover is the lowest.

In an embodiment, said cover can be fastened to the wheel hub.

In a preferred embodiment, the axle comprises a hub reduction unit that is located at the second end of each drive shaft and that is operatively arranged between said second end of each drive shaft and a corresponding wheel hub. In the latter case, the cover is preferably fastened to an axial end of the hub reduction unit. Said axial end of the hub reduction unit is defined with respect to said axis corresponding to the axle axis.

The hub reduction unit preferably includes:

a sun gear rotationally secured to the drive shaft at the end of the drive shaft;

a carrier comprising planet gear axles that hold several planet gears which mesh with the sun gear;

an outer ring secured to the differential carrier housing and meshing with the planet gears.

In that case, the cover is preferably fastened to the carrier.

Preferably, the intermediate piece is provided in the hub reduction unit and said intermediate piece is a washer secured inside the sun gear. In this case, the washer is connected to the end of the shaft via the sun gear.

It has to be noted that the contact may not be exactly a contact point, in particular due to the local flattening of the stop in the contact region with the drive shaft end face, which can occur over time. For example, the second cross-section S2 may be lower than 5 mm$^2$, preferably lower than 1 mm$^2$.

In the system according to the invention, the stop and the drive shaft end face or the stop and the intermediate piece may be in contact substantially at all times, i.e. not only after the stop has been compressed axially above a predetermined threshold. In other words, the stop always provides a substantially point contact with the drive shaft end face or with said intermediate piece.

For example, S2/S1 can be comprised between 50 and 100.

According to an embodiment, the assembly comprises:
a compressible member, which is elastically compressible in the axial direction, said compressible member being secured to the cover and including the first part;
and a rigid member for contacting said drive shaft end face or said intermediate piece, the rigid member having a mounting portion assembled to the compressible member opposite the cover, and a contact portion which includes the second part.

The rigid member is hard, non deformable member (in normal operating conditions). For example, it can be made of a metal, such as steel. Other hard material can however be used.

The face of the rigid member contact portion which faces the drive shaft end face in the mounted position can be dome-shaped. The dome summit area thus forms the second part providing a substantially point contact with the drive shaft end face.

The rigid member mounting portion can include an axial projection capable of being engaged in an axial hole of the compressible member. This projection may be force fitted in said compressible member axial hole.

The compressible member may be substantially cylindrical with a cross-section S1. It can have an axial hole.

The compressible member can be made as a single piece, which allows completely removing any need of adjustment on the assembly line. For example, it can be made as a single piece of an elastically compressible material such as rubber.

Alternatively, the compressible member can comprise at least one washer, or a plurality of washers arranged substantially coaxially along the assembly axis. The washers can be housed in an axial sleeve.

According to an embodiment, the assembly further comprises an abutment for limiting axial compression of the stop. This allows avoiding plastic deformation and collapsing of the stop. With such an implementation, the drive shaft can first move axially towards the corresponding wheel, which results in the stop being compressed axially. Above a predetermined threshold compression value of the compressible member, corresponding to a certain length of axial displacement of the drive shaft, the abutment becomes operational and prevents the drive shaft from moving further towards the wheel, and therefore prevents the stop from being further compressed. This significantly increases the system durability.

With a stop comprising a rigid member and a compressible member, the abutment may comprise a rigid element with which the rigid member can come into contact once the compressible member has reached a predetermined compression state. The assembly is dimensioned so that such a contact occurs before plastic deformation, or other irreversible damage of the compression member.

For example, the stop—or the compressible member—can be designed to absorb between 10 and 50% of the load (or between 1000 N and 5000 N) before the abutment becomes operational. The compression stroke of the stop—or the compressible member—to reach this 1000-5000 N reaction force can be between 1 and 10 mm.

In an embodiment, the rigid element comprises a pin protruding axially from the cover, inside the compressible member axial hole, said pin being designed to abut on the axial projection of the rigid member. The compressible member can be force fitted on said pin.

In another embodiment, the rigid element comprises an axially elongated aperture arranged in a sleeve and in which can slide a radial pin. Said radial pin is engaged in a radial hole in the rigid member and can come into axial contact with an inside surface of the axially elongated aperture once the compressible member has reached a predetermined compression state. Said sleeve is secured to the cover and houses said compressible member.

As regards the cover, it can comprise a radial disc-shaped wall onto which the stop is mounted substantially at the centre, and which comprises assembling means for securing the cover on the wheel hub such as previously described in an embodiment or on the hub reduction unit such as previously described in a preferred embodiment.

According to a second aspect, the invention concerns a system comprising an axle, the axle comprising a differential carrier housing which contains a differential, two drive shafts and two wheel hubs. Each drive shaft has one end connected to the differential and a second end capable of being connected to at least one wheel of the vehicle via a wheel hub. The system further comprises an assembly such as previously described. The cover is mounted at the end portion of the axle and the stop is in contact with a drive shaft end face or with an intermediate piece that can be provided in the axle. Wherein, when provided, said intermediate piece is connected to an end of the drive shaft and is axially located between said drive shaft end face and said stop.

In an embodiment of the system, the cover is fastened to the wheel hub.

In a preferred embodiment of the system, the axle further comprises a hub reduction unit that is located at the second end of each drive shaft and that is operatively arranged between said second end of each drive shaft and a corresponding wheel hub. In that case, the cover is fastened to an axial end of the hub reduction unit opposite said differential.

In a preferred embodiment of the system, the hub reduction unit includes:
a sun gear rotationally secured to the drive shaft at the end of the drive shaft;
a carrier comprising planet gear axles that hold several planet gears which mesh with the sun gear;
an outer ring secured to the differential carrier housing and meshing with the planet gears.

In that case, the cover is preferably fastened to the carrier.

Preferably, said intermediate piece is provided in the hub reduction unit. In that case, the intermediate piece is a washer secured inside the sun gear and the washer is connected to the end of the shaft via the sun gear.

According to a third aspect, the invention concerns a vehicle comprising at least one system as previously described.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 1 is a schematic drawing of an underside of a vehicle showing a rear axle according to an embodiment of the invention;

FIG. 2 is a perspective view of a rear axle, an assembly according to an embodiment of the invention being mounted at each end portion of the axle;

FIG. 5 is a perspective exploded view of an assembly according to one embodiment;

FIG. 6 is a perspective exploded view of an assembly according to another embodiment.

DETAILED DESCRIPTION OF EXAMPLE EMBODIMENTS OF THE INVENTION

Figure 3:
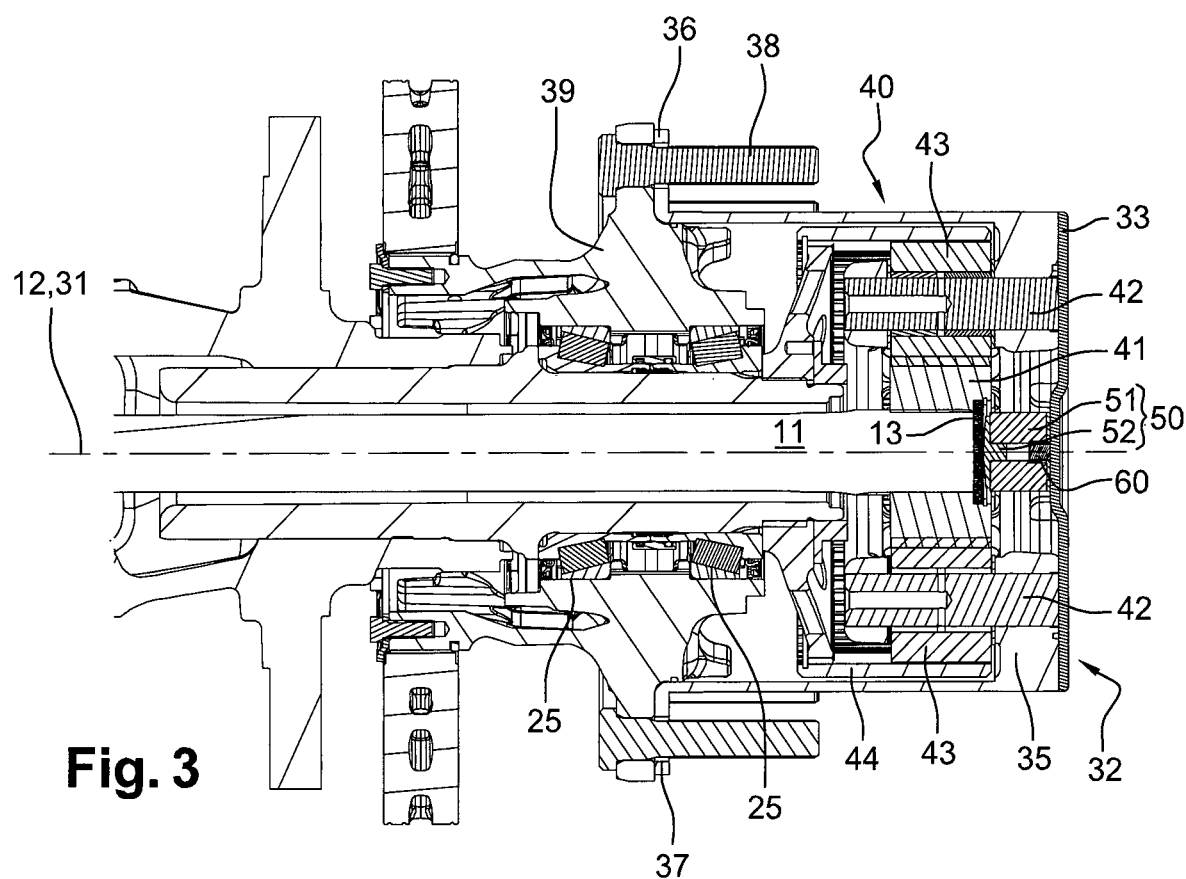
FIG. 3 is a cross-section view of an end part of the rear axle of FIG. 1, showing the assembly.

As shown in FIG. 1, a vehicle 1 comprises an engine 2 that drives an input shaft 3, and a front axle 4 connected to front wheels 5.

The vehicle 1 also comprises at least one rear axle 6. The or each rear axle 6 comprises an axle housing 7 containing a differential unit 10, which includes a differential (not shown), and two drive shafts 11 having a common axis 12. Each drive shaft 11 has a first end connected to the differential and a second end connected to at least one wheel 8. In the illustrated embodiment, the vehicle 1 comprises a first driven rear axle 6a and a second driven rear axle 6b located rearwards from the first driven rear axle 6a, each rear axle 6a, 6b comprising two wheels 8 on either side. An additional shaft 9 connects the input shaft 3 to the differential unit 10 of the second driven rear axle 6b, through the differential unit 10 of the first driven rear axle 6a, and is the input shaft for the differential unit 10 of the second driven rear axle 6b.

With reference to FIG. 2, the axle 6 comprises a differential carrier housing 20. The differential carrier housing 20 is made of a first housing portion 20a, and a second housing portion which can be formed by a portion of the axle housing 7, the first and second housing portions being secured to one another by means of appropriate fasteners 21. In FIG. 2, only part of the first housing portion 20a is illustrated, so that the inside of said differential carrier housing 20 can be seen.

Inside the differential carrier housing 20 is located a crown wheel 22 having a longitudinal axis 23. The crown wheel 22 is driven in rotation around said longitudinal axis 23 by the input shaft 3, by engagement of teeth arranged on a pinion mounted on said input shaft 3 and teeth arranged on the crown wheel 22.

As shown in FIG. 2, the longitudinal direction X is defined as a direction parallel to the longitudinal axis 23 of the crown wheel 22. In the operating position, i.e. when the differential unit is mounted under the vehicle 1, as shown in FIG. 1, the longitudinal direction X corresponds the transverse direction Y' of the vehicle 1, i.e. the direction of the axles 4, 6. Direction X is substantially horizontal when the vehicle 1 is on a horizontal surface.

Besides, the transverse direction Y is defined as the direction which is orthogonal to the longitudinal direction X and substantially horizontal when the vehicle 1 is on a horizontal surface. Direction Y corresponds the longitudinal direction X' of the vehicle 1.

Moreover, direction Z is defined as the vertical direction—when the vehicle 1 is on a horizontal surface.

The invention will be described when the vehicle 1 is on a horizontal surface.

Inside the crown wheel 22 is arranged a differential. The differential comprises differential side pinions and two differential side gears 18, each differential side gear meshing with at least one differential side pinion and being fastened to a first end of one of the drive shafts 11.

The differential unit 10 further comprises, inside the differential carrier housing 20, a differential housing 24 which contains the differential and part of the drive shafts 11, namely the part of each drive shaft 11 which is located near the first end of said drive shaft 11. The differential housing 24 is secured to the crown wheel 22.

The crown wheel 22, differential, and differential housing 24 are rotating parts inside and with respect to the differential carrier housing 20. They are mounted on the inner side of the first housing portion 20a by means of two supporting devices with intermediate bearings.

According to the invention, an assembly 30 is mounted at each end of the axle 6. The assembly 30 has an axis 31 which corresponds to the axle axis in the mounted position, i.e. the axis 23 of the crown wheel 22 and the axis 12 of the drive shafts 11.

The assembly 30 comprises a cover 32 which is mounted at the end portion of the axle 6.

The cover 32 may comprise a radial disc-shaped wall 33 provided with assembling means to be secured on the hub reduction unit 40, such as holes 34 for receiving fasteners.

The axle 6 may be provided with a hub reduction unit 40 at each free end. As shown in FIGS. 2 and 3, the hub reduction unit 40 includes a sun gear 41 rotationally secured to a end of the drive shaft. For example, the outside face of the end portion of the drive shaft 11 is equipped with splines that engage corresponding splines arranged on the inner face of the sun gear 41. The hub reduction unit 40 also includes a carrier 35 comprising planet gear axles 42 that hold several planet gears 43 which mesh with the sun gear 41. The hub reduction unit 40 further includes an outer ring 44 secured to the differential carrier housing 20 and meshing with the planet gears 43.

The carrier 35 comprises a peripheral wall 35 that houses the hub reduction unit 40 and a radial mounting flange 36, for example at the free end of the peripheral wall 35. The radial mounting flange 36 includes attachment means for attachment to a component of the axle 6.

These attachment means can be holes 37 for receiving fasteners 38. As shown in FIG. 3, said component of the axle 6 is typically a wheel hub 39 of the axle 6. The wheel hub has an outer sleeve 39 mounted around the drive shaft 11 with intermediate bearings 25, and capable to have a rotation speed different from the rotation speed of the drive shaft 11 around axis 12, 31.

The cover 32 is fastened to an axial end of the hub reduction unit 40 from the outside of the hub reduction unit 40. More specifically, the cover 32 is fastened to the carrier 35. Fasteners can be used to fasten the cover 32 on the carrier 35 via through holes 34 of the cover 32.

The assembly 30 also comprises a stop 50 fastened to the cover 32 so as to face the corresponding end face 13 of the drive shaft 11 in the mounted position. As shown on FIG. 4 and according to an embodiment, an intermediate piece 15 is connected to the drive shaft end portion and the stop 50 contact axially the intermediate piece 15.

Figure 4:
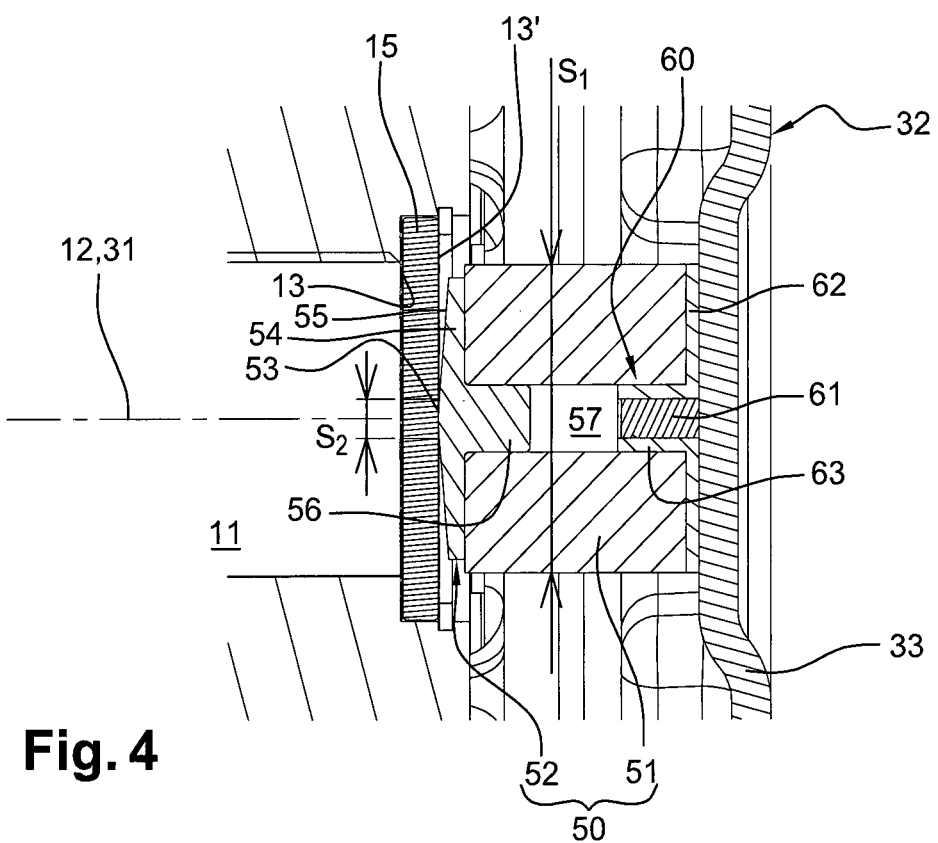
FIG. 4 is an enlarged detailed view of FIG. 3 better showing the assembly.

Such as represented on FIG. 4, the intermediate piece can be a washer 15 that is secured inside the sun gear 41. In this case, the washer 15 can be configured to be elastically deformable in the axial direction. Preferably, the washer 15, the sun gear 41 and drive shaft 11 are secured together without possibility of motions between them in the axial direction. The washer 15 is therefore connected to the end of the drive shaft via the sun gear 41, in such a way that when the stop 50 contacts the washer 15 it provides an axial abutment for the drive shaft 11.

In an alternative (not represented) the stop 50 can contact directly the corresponding end face 13 of the drive shaft 11 to provides an axial abutment for the drive shaft 11.

The stop 50 can be mounted substantially at the centre of the radial disc-shaped wall 33 of the cover 32.

The stop 50 is elastically compressible in the axial direction, i.e. along axis 12, towards the contiguous wheel 8.

According to an embodiment, the stop 50 may comprise a compressible member 51—for providing a damping effect—and a rigid member 52—for contacting the drive shaft end face and providing a hard, substantially point contact.

The compressible member 51 is elastically compressible in the axial direction and is secured to the cover 32. The compressible member 51 has a cross-section S1 which is large enough to give the compressible member 51 a stiffness high enough to allow it absorbing in compression axial movements of the drive shaft 11 (in normal operating conditions).

The rigid member 52 can be made as a single piece of hard material, such as steel or another metal. It provides a substantially point contact with the drive shaft end face 13, 13' or with the washer 15. More specifically, it provides a contact area 53 having a very small cross-section S2, smaller than S1, for example S2 being lower than 5 mm$^2$, preferably lower than 1 mm$^2$. For example, S2/S1 is comprised between 50 and 100.

The rigid member 52 may comprise a contact portion 54 for contacting the drive shaft end face 13, 13' or the washer 15. The face 55 of said contact portion 54 which faces the drive shaft end face in the mounted position can be dome-shaped. The rigid member 52 may further comprise a mounting portion 56 assembled to the compressible member 51 opposite the cover 32. Said mounting portion 56 can include an axial projection capable of being engaged in an axial hole of the compressible member 51.

The assembly 30 can further comprise an abutment 60 for limiting axial compression of the stop 50 and therefore protecting the stop 50. The abutment 60 can typically comprise a rigid element with which the rigid member 52 can come into contact once the compressible member 51 has reached a predetermined compression state. The rigid element can be a part specifically provided for abutment purposes, such as a separate part fixed on the cover 32. Alternatively, the axial projection 56 could abut on the radial disc-shaped wall 33 of the cover 32 itself, no additional specific part being provided.

A first embodiment of the assembly 30 is illustrated in FIGS. 3-5.

In this embodiment, the compressible member 51 is made as a single piece of an elastically compressible material such as rubber, or another material that can resist oil. The compressible member 51 can be substantially cylindrical, arranged with its axis along the axle axis. The compressible member 51 can have an axial hole 57 in which the axial projection forming the mounting portion 56 of the rigid member 52 can be engaged.

The abutment 60 comprises a pin 61 protruding axially from the cover 32, inside the compressible member axial hole 57. Said pin 61 is designed to abut on the axial projection 56 of the rigid member 52.

In an embodiment, the pin 61 is welded on the cover 32 and has an outer thread. Furthermore, there is provided a plate 62 including a cylindrical housing 63 having an inner thread for receiving the pin 61. The plate 62 can be a steel plate vulcanized on the compressible member 51 made of rubber.

A second embodiment of the assembly 30 is illustrated in FIG. 6.

In this embodiment, the compressible member 51 comprises at least one washer 59, or here a plurality of washers arranged substantially coaxially along the assembly axis. The washers 59 are housed in a sleeve 64 secured to the cover 32.

The abutment 60 comprises an axially elongated aperture 68 arranged in the sleeve 64 and in which can slide a radial pin 66. The radial pin 66 is engaged in a radial hole 67 in the rigid member 52—for example in the axial projection forming the mounting portion 56—and the radial pin 66 can come into axial contact with an inside surface of the axially elongated aperture 68 once the compressible member 51 has reached a predetermined compression state.

The elongated aperture 68 allows a predetermined displacement stroke of the pin 66, i.e. of the rigid member 52, thereby preventing the compressible member 51 from being too much compressed and thus from being damaged.

The assembly according to the invention, comprising an elastically compressible stop including a first part for absorbing in compression axial movements of the drive shaft and a second part for providing a substantially point contact with the drive shaft end face or with the washer 15 secured inside the sun gear 41, results in significant improvements in terms of assembly simplicity and durability. Such a stop absorbs the clearance between the drive shaft and the cover, which allows assembling the hub directly, without any adjustment. Optimization of mounting operations results in cost savings. Furthermore, owing to the elastically compressible stop, shocks and noise on the cover are reduced. Moreover, having a point contact between the drive shaft and the cover limits friction surface and thus premature wear.

According to a specific embodiment, the stop consists of an elastic bumper coupled with a rigid stop, and an abutment is provided, which has many advantages. Then, during a first part of the drive shaft movement, the elastic member is compressed, resulting in a damping system. When the drive shaft movement goes on, forces increase, and a hard contact occurs. These additional forces are passing directly through this hard contact, ensuring durability of the elastic member, contrary to some prior art systems in which all forces are passing through the elastic member, thus damaging said elastic member.

It is to be understood that the present invention is not limited to the embodiments described above and illustrated in the drawings; rather, the skilled person will recognize that many changes and modifications may be made within the scope of the appended claims.

The invention claimed is:

1. An assembly designed to be mounted at an end portion of an axle of a vehicle, the axle comprising a differential carrier housing which contains a differential, two drive shafts and two wheel hubs, wherein each drive shaft has one end connected to the differential and a second end configured to be connected to at least one wheel of the vehicle via a wheel hub, the assembly comprising:
a cover configured to be mounted at the end portion of the axle;
a stop fastened to the cover so as to face one end face of one drive shaft of the two drive shafts in a mounted position, the stop configured to be elastically compressible in the axial direction between:
the cover and an end of the drive shaft; or
between the cover and an intermediate piece in the axle, the intermediate piece connected to an end of the drive shaft and axially located between said one end face of the one drive shaft and said stop;
wherein the stop comprises:
a first part having a first cross-section S1, the first part being configured to absorb in compression axial movements of the one drive shaft; and
a second part having a second cross-section S2 smaller than the first cross-section S1, the second part configured to provide a substantially point contact with the one end face of the one drive shaft or the intermediate piece.

2. The assembly of claim 1, wherein the cover is fastened to the wheel hub.

3. The assembly of claim 1,
wherein the axle comprises a hub reduction unit that is located at the second end of each drive shaft and that is operatively arranged between said second end of each drive shaft and a corresponding wheel hub; and
wherein the cover is fastened to an axial end of the hub reduction unit.

4. The assembly of claim 3, wherein the hub reduction unit includes:
a sun gear rotationally secured to the one drive shaft at the end of the one drive shaft;
a carrier comprising planet gear axles that hold several planet gears which mesh with the sun gear; and
an outer ring secured to the differential carrier housing and meshing with the planet gears,
wherein the cover is fastened to the carrier.

5. The assembly of claim 4, wherein said intermediate piece is provided in the hub reduction unit, said intermediate piece comprising a washer secured inside the sun gear, the washer connected to the end of the one drive shaft via the sun gear.

6. The assembly of claim 1, wherein $S2 < 5$ mm$^2$.

7. The assembly of claim 1, wherein $S2/S1$ is comprised between 50 and 100.

8. The assembly of claim 1 further comprising:
a compressible member, which is elastically compressible in the axial direction, said compressible member being secured to the cover and including the first part; and
a rigid member for contacting the one end face of the one drive shaft or the intermediate piece, the rigid member having a mounting portion assembled to the compressible member opposite the cover, and a contact portion which includes the second part.

9. The assembly of claim 8, wherein a face of the rigid member contact portion which faces the drive shaft end face of the one drive shaft in the mounted position is dome-shaped.

10. The assembly of claim 8, wherein the rigid member mounting portion includes an axial projection configured to engage an axial hole of the compressible member.

11. The assembly of claim 8, wherein the compressible member is substantially cylindrical and has a cross-section S1.

12. The assembly of claim 8, wherein the compressible member has an axial hole.

13. The assembly of claim 8, wherein the compressible member is made as a single piece of an elastically compressible material such as rubber.

14. The assembly of claim 8, wherein the compressible member comprises at least one washer arranged substantially coaxially along an assembly axis.

15. The assembly of claim 1, further comprising an abutment for limiting axial compression of the stop.

16. The assembly of claim 15, further comprising:
a compressible member, which is elastically compressible in the axial direction, said compressible member being secured to the cover and including the first part; and
a rigid member for contacting the one end face of the one drive shaft or the intermediate piece, the rigid member having a mounting portion assembled to the compressible member opposite the cover, and a contact portion which includes the second part,
wherein the abutment comprises a rigid element configured to contact the rigid member upon the compressible member reaching a predetermined compression state.

17. The assembly of claim 16, wherein:
the rigid member mounting portion includes an axial projection configured to engage an axial hole of the compressible member; and
the rigid element comprises a pin protruding axially from the cover inside the compressible member axial hole, said pin configured to abut the axial projection of the rigid member.

18. The assembly of claim 16,
wherein the rigid element comprises an axially elongated aperture arranged in a sleeve in which can slide a radial pin, wherein said radial pin is engaged in a radial hole in the rigid member and is configured to axially contact an inside surface of the axially elongated aperture once the compressible member has reached the predetermined compression state; and
wherein the sleeve is secured to the cover and houses the compressible member.

19. The assembly of claim 1, wherein the cover comprises a radial disc-shaped wall onto which the stop is mounted substantially at the centre, and which comprises holes for securing the cover to at least one of:
one wheel hub of the two wheel or
to a hub reduction unit of the axle, the hub reduction unit at the second end of each drive shaft and operatively arranged between said second end of each drive shaft and a corresponding wheel hub, the cover fastened to an axial end of the hub reduction unit.

20. A system comprising:
an axle comprising a differential carrier housing which contains a differential, two drive shafts and two wheel hubs, wherein each drive shaft has one end connected to the differential and a second end configured to be connected to at least one wheel of a vehicle via a wheel hub; and
the assembly of claim 1, wherein the cover is mounted at the end portion of the axle and the stop is in contact with at least one of:
a drive shaft end face; or
the intermediate piece in the axle, the intermediate piece connected to an end of one drive shaft of the two drive shafts and axially located between said drive shaft end face and said stop.

21. The system according to of claim 20, wherein the cover is fastened to the wheel hub.

22. The system of claim 20,
wherein the axle further comprises a hub reduction unit that is located at the second end of each drive shaft and that is operatively arranged between said second end of each drive shaft and a corresponding wheel hub; and wherein the cover is fastened to an axial end of the hub reduction unit opposite said differential.

23. The system of claim 22, wherein the hub reduction unit includes:
a sun gear rotationally secured to the one drive shaft at the end of the one drive shaft;
a carrier comprising planet gear axles that hold several planet gears which mesh with the sun gear; and
an outer ring secured to the differential carrier housing and meshing with the planet gears,
wherein the cover is fastened to the carrier.

24. The system of claim 23, wherein said intermediate piece is provided in the hub reduction unit, said intermediate piece comprising a washer secured inside the sun gear, the washer connected to the end of the one drive shaft via the sun gear.

25. A vehicle comprising the system of claim 20.

* * * * *